United States Patent Office 2,919,569
Patented Jan. 5, 1960

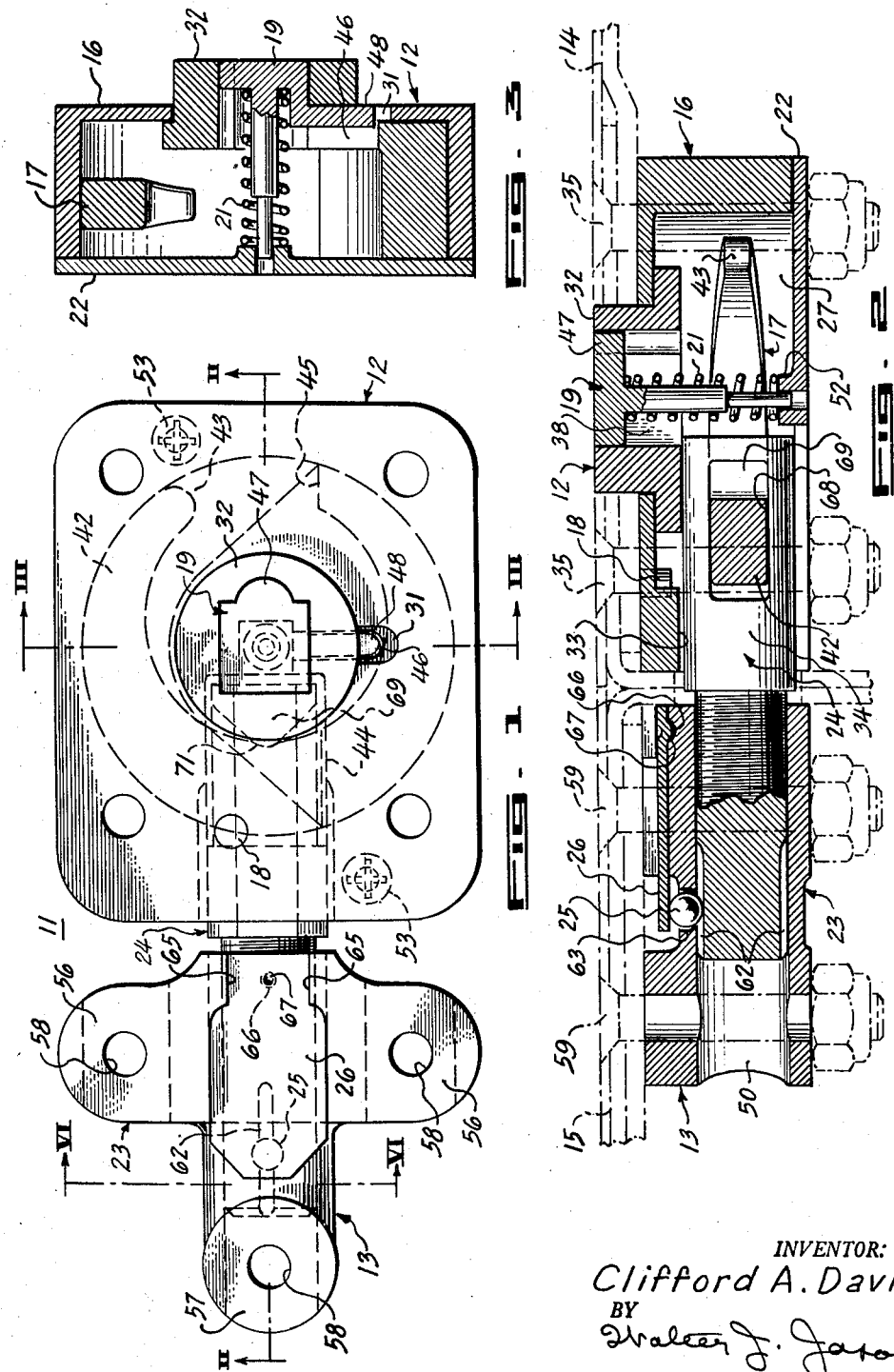

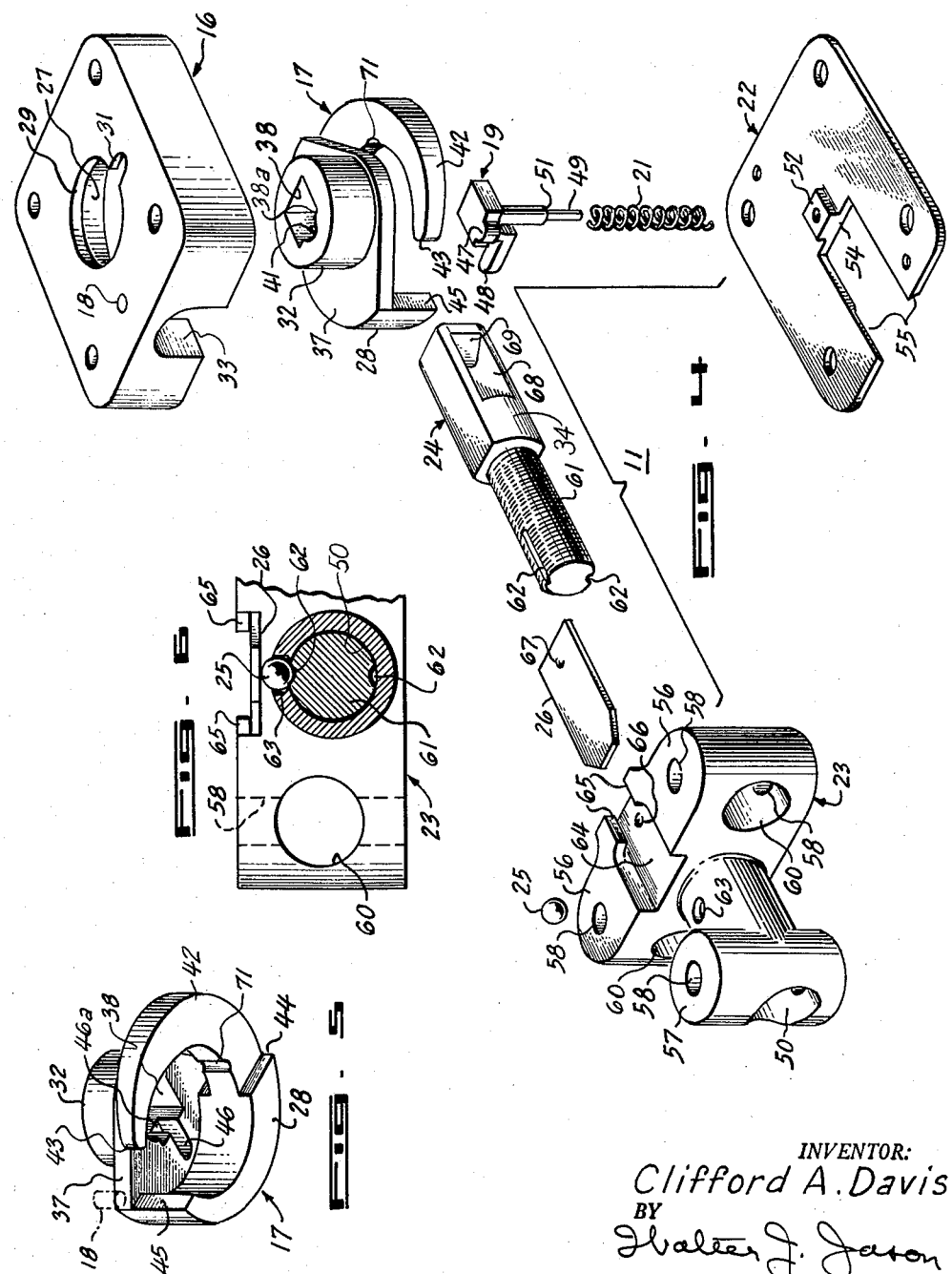

2,919,569

FASTENING DEVICE HAVING A ROTATABLE LATCH

Clifford A. Davis, Weatherford, Tex., assignor to General Dynamics Corporation (Convair Division), San Diego, Calif., a corporation of Delaware Application March 30, 1955, Serial No. 497,941

7 Claims. (Cl. 70—97)

The present invention relates to fastening devices and more particularly to a flush-mounted fastening device which embodies a rotary latch mechanism for releasably securing together a plurality of component members.

The fastening device of the present invention is particularly adapted for use in connection with aircraft because of its light weight, reliability, and high strength. Accordingly, the description hereinafter made will be directed for the most part to the releasable securement of aircraft components, although it is to be understood that the present device is not limited to aircraft components but is also adapted for connecting together in disengageable fashion other forms of structural elements.

In aircraft, the present latching or fastening device is well suited for securing in position such components as access doors, inspection plates, removable panel or cowl sections, and fuselage and nacelle components. The fasteners for these components should be adapted to effect ready and quick disconnection of the components when desired, and where the components form part of the external surfaces of the aircraft, the fastening devices used therewith should be designed for flush mounting whereby there results a minimum of discontinuity in the component surfaces, and a minimum of resistance to the airstream for desirable strength and aerodynamic drag characteristics. Various fasteners are to be found in the prior art for accomplishing these objectives, but generally they are complicated and heavy or are deficient in strength and reliability, or generate undesirable aerodynamic turbulence where used on external aircraft surfaces.

Accordingly, the fastening device of the present invention is designed for flush installation in a single, small circular opening in the outer surface of one of the components to be secured together. Since only a slight peripheral gap is thus presented to the airstream, there is very little turbulence, and a simplified form of construction is afforded. The device comprises a minimum of parts to thereby achieve simplicity and reduced weight. Thus, even the usual integral actuating handle of the conventional flush-type fastening device has been eliminated to provide a lighter device, and instead appropriate structure is provided to permit insertion of a suitable tool, as will be seen, for actuation and operation of the device.

The rotary latch construction of the invention uniquely cooperates with a clevis mechanism in a clamping position which can be maintained under considerable and even simultaneously applied tension and shear loads. In addition, the clevis mechanism embodies novel adjusting members for varying the tolerance, as desired, between parts which are connected by the device.

It is therefore an object of the present invention to provide an improved fastening device for releasably securing together a plurality of members, and which embodies a latch mechanism for connecting the plurality of members together in a positive manner.

Another object of the invention is to provide a unique fastening device which embodies a rotatable engaging mechanism and an associated indicating element for indicating the engaged and disengaged positions of the latching mechanism.

It is another object of the invention to provide a novel fastening device which is adapted for withstanding high loads in tension and in shear and which is adjustable for varying the tolerance between parts thereby connected.

Still another object of the invention is to provide a novel fastening device which incorporates a rotatable latching element for releasably securing together a pair of members, which element is inoperable until deliberate and separate actuation of an independent release element has been made.

An additional object of the invention resides in the provision of an improved fastening device which is of the flush installation type and which is comprised of comparatively few operating parts, which acts in a positive manner for releasably securing together a pair of members, and which visually indicates whether or not it is in its secured position.

Another object of the present invention is to provide an improved fastening device which is of comparatively shallow depth, simple in operation, and economical to manuafacture.

Other objects and features of the present invention will be readily apparent to those skilled in the art from the following specification and appended drawings wherein is illustrated a preferred form of the invention, and in which:

Figure 1 is a plan view of the preferred embodiment of the fastening device of the present invention;

Figure 2 is a view taken along II—II of Figure 1;

Figure 3 is a view taken along III—III of Figure 1;

Figure 4 is an exploded perspective view of the present fastening device;

Figure 5 is a perspective view of the rotatable cam element; and

Figure 6 is a partial view taken along VI—VI of Figure 1, and illustrating the spring loaded ball detent in its housed position.

Referring to the drawings and more particularly to Figures 1, 2 and 4, there is illustrated an embodiment of the fastening device of the present invention which will be described in connection with the securement of an aircraft access door to adjoining fuselage structure. It is to be understood of course that the particular application described is merely illustrative and the present invention is not to be limited thereto.

The fastening device is designated by the numeral 11, and comprises two principal portions, a cam component or assembly 12, and a clevis component or assembly 13 which cooperates with and is adapted to partially fit within cam assembly 12. In Figure 2, cam assembly 12 is shown on the right secured at and within the edge structure of a typical aircraft access door 14 illustrated in part and in dash-dot outline, while clevis assembly 13 is shown on the left in fixed association with typical fuselage structure 15 also illustrated in dash-dot outline. It is noted that appropriate openings are provided in door 14 and structure 15 to permit the location and operation of device 11. Cam assembly 12 includes a housing 16 generally located beneath the undersurface of access door 14; a rotary, generally crescent-shaped cam 17 adapted and mounted for rotational movement within housing 16; a limiter or stop 18 mounted in housing 16 for limiting the extent of rotatable travel by cam 17 within housing 16; a movable locking plug 19 generally disposed vertically and slidably through the center of housing 16; a compression spring 21 for resiliently maintaining plug in its upper position; and a lower cover plate 22 which serves to close the open lower portion of housing 16.

Clevis assembly 13, which mates with cam assembly 12, includes a T-shaped fitting or mount 23 which serves to support and house a clevis pin 24 in adjustable longitudinal and rotational position; a ball detent 25 for cooperation with clevis pin 24 to establish the rotated position of clevis-pin 24 by engagement therewith; and a flat or leaf spring 26 for urging ball detent 25 into its engaged position with clevis pin 24.

As best seen in Figure 4, housing 16 of cam assembly 12 is essentially a rectangular block having its base or lower portion hollowed or machined out to form a cylindrical chamber or recess 27 for rotatably receiving a portion 28 of cam 17. A circular aperture 29, having a U-shaped slot or keyway 31, is provided through the upper surface of housing 16 to communicate with recess 27 in concentric relationship therewith. Aperture 29 is thus adapted to rotatably receive cylindrical upper portion 32 of cam 17, this upper portion 32 being of sufficient height to project through aperture 29 and into flush relationship with the outer surface of access door 14 when the present fastening device is mounted in operative position.

Through a U-shaped channel 33 in the left wall of housing 16, accommodation is provided for substantially cylindrical portion 34 of clevis pin 24 during engagement of clevis assembly 13 with cam assembly 12, as best viewed in Figure 2. It is noted that housing 16 may be secured to access door 14 by any suitable means, as by bolt and nut assemblies 35 associated with mounting holes in the corners of cover plate 22, housing 16, and door 14, as illustrated.

Cylindrical upper portion 32 of cam 17, Figure 4, is mounted for rotation within a suitable opening provided in the upper surface of access door 14, the opening being made just large enough to permit ready rotation of portion 32 whereby a desirable streamline effect is preserved. Portion 32 is substantially concentric with lower portion 28 of cam 17, and is joined thereto by a web 37. In addition, upper portion 32 is provided with a centrally located, vertically disposed aperture 38 which is substantially square in cross section and embodies in the vertical length of one interior wall 38a a groove 41 which serves to indicate the rotated position of locking plug 19, as will be hereinafter described. It is noted that the generally square configuration of aperture 38 adapts this aperture to operatively receive the square end of a conventional standard socket wrench or other similar tool whereby, as will be hereinafter further described, locking plug 19 can be depressed to inoperative position so that cam 17 can then be rotated between its open and closed positions.

The lower portion 28 of cam 17 embodies an integral, arcuately extending hook or wedge element 42 whose outer and inner vertically disposed faces form a continuation of the outer and inner vertically disposed faces of lower portion 28. As best illustrated in Figures 1 and 5, wedge element 42 diminishes in thickness to a rounded end 43, and at its other end, is joined to lower portion 28 at the mid portion of an end or stop wall 44 of portion 28 which lies parallel with the longitudinal centerline of cam assembly 12. From wall 44, lower portion 28 of cam 17 decreases in wall thickness to an end wall 45 which is parallel to wall 44 and offset but parallel with the longitudinal centerline of cam assembly 12. It is noted that end 43 of wedge 42, and end wall 45 of portion 28, are approximately equidistant from the centerline of cam assembly 12 and suitably spaced so that upon assembly of the present fastening device 11, clevis pin 24 will be permitted to easily enter between end wall 45 and end 43.

Web 37 of cam 17 is provided with a slot or keyway 46 which extends vertically through web 37 and upwardly for a distance into the upper portion 32 of cam 17 and is in communication with aperture 38. In a horizontal plane, keyway 46 is disposed at approximately a right angle to groove 41 of portion 32, while the vertical disposition of keyway 46 is such that the defining upper wall 46a of keyway 46 serves to limit the upward travel of spring-loaded plug 19, as will be hereinafter described. It will be apparent that when cam assembly 12 and clevis assembly 13 are engaged in the locked position, keyway 46 aligns and is in communication with keyway 31 in the upper wall of housing 16 as seen in Figure 3, keyway 31 being preferably made slightly wider than keyway 46, as shown in Figure 1, to permit some tolerance in the alignment therebetween.

Locking plug 19 which is adapted to slidably fit within aperture 38 of cam 17 is generally square in outline and flat at its top, and is provided with a projection 47, Figure 4, which is formed for complemental and vertically slidable association with groove 41 of cam 17. In addition, an integral generally L-shaped locking tab or key 48 extends from plug 19 outwardly at approximately a right angle to projection 47. Key 48 is adapted to fit within keyway 46, and serves to limit the upward travel of plug 19 by contacting the upper surface 46a of keyway 46, and also serves to secure cam 17 against rotatable movement and in a locked position. With cam 17 in its locked position, that is, in a position constrained against movement, it will be seen, as best shown in Figure 3, that the upper surface of plug 19 is flush with the upper surface of portion 32 of cam 17, and the upper surface of locking key 48 of plug 19 is approximately flush with the upper surface of housing 16. In contrast, when cam 17 is to occupy its unlocked position an appropriate tool is applied to plug 19 to push it to a depressed position wherein locking key 48 is no longer mated with keyway 31 of housing 16. Cam 17 may then be freely rotated within recess 27 of housing 16 as by the tool which depressed plug 19, plug 19 thereafter being restrained in its depressed position by the engagement of locking key 48 with the underside of the upper wall of housing 16. It is noted that when plug 19 is in its depressed position a visual indication is afforded the observer that cam 17 is in its unlocked position since securement of cam 17 in its locked position is possible only when the locking key 48 is housed within keyway 31.

Plug 19 further embodies a downwardly extending integral pin 49 whose lower portion is smaller in diameter than its upper portion thereby forming a stop or shoulder 51. The lower portion of pin 49 is adapted to fit within an opening provided in a boss 52 which is integral with cover plate 22. Spring 21, which encompasses both the upper and lower portions of pin 49, exerts its bias against the underside of plug 19 and against the upper surface of boss 52 thereby serving to urge plug 19 upwardly. The engagement of the lower portion of pin 49 in the opening of boss 52 serves to guide the plug 19 in its vertical travel, it being noted that during operation of the present device 11 the lower end of pin 49 does not extend beyond the underside of cover plate 22 in either the locked or unlocked position of device 11. Thus the lower end of pin 49 is protected against bending and other damage which might otherwise occur. The other portions of cam assembly 12 are protected from damage by housing 16, and by cover plate 22 which is secured to housing 16 in any usual manner, such as by a pair of screws 51, Figure 1.

The left portion of cover plate 22 is provided with a rectangular slot 54 which is approximately as wide as U-shaped channel 33 in housing 16 and extends from the edge of cover plate 22 to the edge of boss 52, and has its side walls 55 beveled, as illustrated, to facilitate entry of clevis pin 24 therethrough when, for example, access door 14 is of that type which swings down upon clevis assembly 13 during its latching operation.

Stop 18, Figures 1, 2 and 5, is press fitted in a suitable opening in the upper wall of housing 16, and serves to limit the unlatching or counterclockwise rotation of cam 17. The lower end of stop 18 extends downwardly into recess 27 of housing 16 far enough so that it will be struck by the edge of web 37 of cam 17 when cam 17 is rotated in a counterclockwise direction. Thus stop 18 serves to limit the rotation of cam 17 and position it for re-entry of clevis pin 24.

T-shaped mount 23 includes a pair of outwardly disposed portions 56 and a rearwardly disposed portion 57 which serve essentially as mounting pads, being provided with suitable, vertically disposed mounting holes 58 for attaching clevis assembly 13 to the fuselage structure 15 by bolt and nut assemblies 59. Portions 56 preferably are provided with horizontally disposed lightening holes 60 for weight-saving purposes, while mount 23 is provided with a longitudinally extending and horizontally disposed bore 50 which passes completely the length thereof. Bore 50 is internally threaded for the greater portion of its length, thereby being adapted to engage an externally threaded portion 61 of clevis pin 24.

Clevis pin 24 is restrained against accidental rotation within bore 50 of mount 23 by the action of ball detent 25 which is urged by leaf spring 26 into one of a pair of diametrically opposed, longitudinally extending grooves 62 provided at the left end of threaded portion 61 of clevis pin 24. As best seen in Figure 6, ball detent 25 nests within an opening 63 in the upper wall of bore 50 of mount 23 and extends through opening 63 for association with groove 62 of clevis pin 24. Ball detent 25 cannot fall through opening 63 into bore 50 for the reason that opening 63 is slightly smaller at its base than the diameter of detent 25.

Ball detent 25 is urged downwardly by leaf spring 26, which is curved downwardly to lightly preload ball detent 25. Leaf spring 26 is held in position within a slot 64 by tightly fitting beneath and against a pair of opposed retaining lugs 65 on either side of slot 64. A shallow depression 66 is provided in slot 64 to mate with a button 67 formed on the underside of spring 26, Figure 2, so that spring 26 snaps into the desired position.

Threaded clevis pin 24 is adjusted in its longitudinal and rotational relation with mount 23 by forcible rotation thereof. This forces ball detent 25 upwards out of groove 62, and flexes the end of leaf spring 26 upwards. Each time pin 24 is rotated one-half turn, detent 25 will "snap" into one of the pair of grooves 62 of pin 24, and when the desired adjustment of clevis pin 24 has been achieved detent 25 will be firmly nested in one of the grooves 62 thereby preventing accidental rotation of pin 24. Proper adjustment of the position of pin 24 will establish a satisfactory relationship of the components of the present device 11 to permit clevis assembly 13 to snugly and fixedly engage cam assembly 12. The fineness of adjustment desired may be established by the number of threads per inch provided for bore 50 and pin 24.

The portion of clevis pin 24 opposite threaded portion 61 embodies an aperture or eye 68 therethrough having one of its interior defining walls rounded to form an engaging projection or portion 69. This engaging portion 69 is rounded to provide a smoothly curved bearing surface for contacting and engaging wedge element 42 upon latching of assemblies 12 and 13, and additionally serves to snap into a vertically disposed and mating recess 71, Figures 4 and 5, provided in the inner face of wedge 42, when wedge 42 is in its closed or locked position. More specifically, wedge 42 is adapted to pass through eye 68 of clevis pin 24 and fit therewithin in substantially snug and close fitting relation to prevent undesirable relative motion therebetween when the present device is in locked position; it is noted that the mating of ball detent 25 within one of grooves 62 of clevis pin 24 insures that eye 68 of pin 24 will be in proper position to receive wedge element 42. Further, it is apparent that the shape and size of clevis pin 24 will effect a snug fit between it and channel 33 of housing 16, and between it, web 37 of cam 17 and cover plate 22 whereby any movement of clevis 24 when in locked position is substantially eliminated.

In the operation of fastening device 11 of the present invention, a standard conventional socket wrench drive or other suitable tool (not shown) is employed to actuate the device. The end of the socket drive is pushed down upon the upper surface of plug 19, moving plug 19 downwardly against the bias of spring 21 whereby the socket drive enters aperture 38. Locking key 48 in this movement of plug 19 is disengaged from keyway 31, and shoulder 51 of plug 19 contacts the upper surface of boss 52. Rotation of the socket drive will then rotate cam 17, thereby withdrawing wedge element 42 from slot 68 in clevis pin 24. This rotary motion of cam 17 is terminated by the vertically disposed face of web 37 contacting stop 18 in housing 16, and cam assembly 12 and clevis assembly 13 may then be readily separated. Plug 19 remains in a depressed position, providing visual indication that the fastening device 11 of the present invention is not in its locked or secured position.

To close or latch the device, cam assembly 12 and clevis assembly 13 are placed together to permit wedge element 42 to enter slot 68 of clevis pin 24, groove 41 in aperture 38 serving to indicate when cam 17 has been rotated to its fully open or unlocked position. Rotation of cam 17 by the previously described socket drive in a clockwise direction effects a camming or wedging engagement of element 42 with clevis pin 24 whereby pin 24 is drawn further, and tightly, into housing 16. The extent of rotative movement of cam 17 is determined by stop wall 44 which is adapted to engage with the edge of clevis pin 24.

With cam 17 in its closed position, key 48 will be aligned with keyway 31 in housing 16, and removal of the socket drive or other actuating tool from aperture 38 then permits plug 19 to be forced upwardly by spring 21 until the upper surface of plug 19 is substantially flush with the upper surface of portion 32 of cam 17 and the upper surface of access door 14. Further, key 48 of plug 19 is then disposed within keyway 31, thereby preventing further rotation of cam 17 without again depressing plug 19. Thus a flush mounting is provided by fastening device 11, and visual indication is afforded of the fully latched and secured position of device 11.

The present invention provides an improved fastener which is adapted to securely attach a removable or hinged element to a relatively fixed element with a minimum interruption in the structural continuity of the surfaces of the elements to be attached. The fastener is simple to operate, is adapted to be operated by a detachable or separate tool, and is provided with mechanism for preventing inadvertent or accidental release of the fastener.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A fastening device comprising a mount, an engageable element supported by said mount, a housing adapted to accommodate a portion of said engageable element, means rotatable within said housing, said means including an arcuately extending wedge element diminishing in thickness and height to an end portion to form wedging surfaces in two planes for progressively engaging said engageable element in wedging relationship to thereby draw and secure together said mount and said housing and to urge said mount and said housing in predetermined planar alignment, and a movable member for normally preventing disengagement of said rotatable means from said engageable element, said movable member being actuable to a position to permit disengagement of said rotatable means from said engageable element.

2. A fastening device comprising a mount, a clevis pin longitudinally adjustably supported by said mount and having a projecting portion, a housing adapted for receiving the projecting portion of said clevis pin, locking means located within said housing and including a wedge element movable to engage and draw together said projecting portion in wedged and secured relationship, a release mechanism adapted for cooperation with said housing to normally prevent movement of said locking means and including a locking key slidable in said housing, spring means normally urging said locking key of said release mechanism into cooperation with said housing, said release means being adapted for external actuation against the urging of said spring means to move said locking key inwardly out of cooperation with said housing and into said housing to thereby permit common movement of said release means and said locking means out of engagement with said projecting portion of said clevis pin.

3. A fastening device comprising an engageable element, a housing embodying a central recess and a slot whereby said housing is adapted to receive said engageable element, a latch rotatably disposed within said recess, said latch embodying a central opening and including an integral wedge element adapted upon rotation of said latch in a first direction to engage said engageable element in a locked position, a release element slidably disposed within the central opening of said latch and adapted to cooperate with said housing to prevent rotation of said latch when said engageable element is in a locked position, said release element being actuable for slidable movement out of cooperation with said housing to permit rotation of said latch in a second direction to thereby disengage said engageable element from said wedge element.

4. A fastening device comprising a mount, on engageable element supported by said mount, a housing adapted to accommodate a portion of said engageable element, means having wedging surfaces in two planes and rotatable within said housing for progressively engaging said engageable element in wedging relationship in both planes to thereby draw and secure together said mount and said housing in a direction along the axis of rotation of said rotatable means, and a depressible movable member for normally preventing disengagement of said rotatable means from said engageable element, said movable member being depressible in a direction along the axis of rotation of said rotatable means and rotatable with said rotatable means to permit disengagement of said rotatable means from said engageable element, said rotatable means and said movable member having substantially the same axis of rotation.

5. A fastening device comprising a mount, a clevis pin adjustably supported by said mount and having a projecting portion, detent means carried by said mount for releasably maintaining said clevis pin in longitudinally adjusted position relative to said mount, a housing adapted for receiving the projecting portion of said clevis pin, locking means located within said housing and movable to engage said projecting portion in secured relationship, a release mechanism adapted for cooperation with said housing to normally prevent movement of said locking means and including a locking key slidable in said housing, spring means normally urging said release mechanism into cooperation with said housing, said locking key of said release means being adapted for external actuation against the urging of said spring means to move said locking key inwardly out of cooperation with said housing and into said housing to thereby permit common movement of said release means and said locking means out of engagement with said projecting portion of said clevis pin.

6. A fastening device comprising a mount, an apertured adjustly supported by said mount, a housing embodying a central recess and a slot whereby said housing is adapted to receive a portion of said apertured element, a latch rotatably disposed within said recess, said latch embodying a central opening, and including an integral wedge element adapted upon rotation of said latch in a first direction to move through the aperture of said apertured element to thereby secure together said latch and said apertured element, a release element slidably disposed within the central opening of said latch and adapted to cooperate with said housing to prevent rotation of said latch when said apertured element and said wedge element are secured together, said release element being actuable for slidable movement out of cooperation with said housing to permit rotation of said latch in a second direction to thereby withdraw said wedge element from said apertured element.

7. A fastening device adapted for mounting to a first structure and to a second structure for drawing and securing together said structures, said device comprising a members adapted for securement to the underside of said first structure, said member having an aperture, a housing adapted for securement to the underside of said second structure, rotatable means having a lower portion carried within said housing and an upper portion extending through an opening provided in said housing and through an opening provided in said second structure whereby the upper surface of said upper portion is flush with the upper surface of said second structure, said lower portion of said rotatable means embodying a wedge element adapted for movement through the aperture of said member to thereby secure said rotatable means and said apertured member in engagement, and a release element for normally preventing disengagement between said rotatable means and said apertured member when said release element is in a normal position with its upper surface in flush relationship with the upper surface of said second structure, said release element being adapted for depression to a release position beneath the upper surface of said second structure to permit rotation of said rotatable means and consequent disengagement between said rotatable means and said apertured member.

References Cited in the file of this patent

UNITED STATES PATENTS

| Number | Name | Date |
|---|---|---|
| 595,606 | Crouch et al. | Dec. 14, 1897 |
| 1,226,597 | Re | May 15, 1917 |
| 1,263,349 | Holtzman | Apr. 16, 1918 |
| 1,673,329 | Hart | June 12, 1928 |
| 1,748,255 | Tibbetts | Feb. 25, 1930 |
| 1,860,708 | Falk | May 31, 1932 |
| 1,983,747 | Gahagan | Dec. 11, 1934 |
| 2,024,441 | Fitz Gerald | Dec. 17, 1935 |
| 2,097,504 | Wells | Nov. 2, 1937 |
| 2,387,187 | Smith | Oct. 16, 1945 |
| 2,422,723 | Fisher | June 24, 1947 |
| 2,506,553 | Slaughter et al. | May 2, 1950 |
| 2,720,773 | Gehrie | Oct. 18, 1955 |
| 2,767,007 | Burke | Oct. 16, 1956 |

FOREIGN PATENTS

| Number | Country | Date |
|---|---|---|
| 77,859 | Switzerland | June 1, 1918 |
| 142,317 | Germany | July 7, 1903 |